(12) United States Patent
Hong (10) Patent No.: US 6,528,963 B1
(45) Date of Patent: Mar. 4, 2003

(54) ROBOT AND METHOD FOR CONTROLLING MOTOR SPEED OF THE ROBOT

(75) Inventor: Yong-joon Hong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/866,771

(22) Filed: May 30, 2001

(30) Foreign Application Priority Data

Dec. 13, 2000 (KR) .............................................. 00/76248

(51) Int. Cl.$^7$ ............................................ G05B 19/416
(52) U.S. Cl. ............. 318/568.18; 318/569; 318/568.11; 318/568.24; 901/14; 901/20; 901/9; 901/10
(58) Field of Search ........................... 318/568.13, 569, 318/568.11, 568.18, 568.24; 901/14, 20, 9, 10

(56) References Cited

U.S. PATENT DOCUMENTS 6,278,253 B1 * 8/2001 Hong .................... 318/568.13

* cited by examiner

Primary Examiner—Karen Masih
(74) Attorney, Agent, or Firm—Staas & Halsey LLP (57) ABSTRACT

Disclosed is a method of controlling a robot including a motor having a rotation shaft, an arm part having one end connected to the rotation shaft and interlocking with a rotation of the motor, a position controller controlling the motor, and a main controller generating a speed command profile for controlling the motor, based on the inputted motion command of the arm part and transmitting the profile to the position controller, comprising a step of generating the speed command profile controlling a speed of the motor so as to allow the arm part to have an acceleration profile in uniform speed. With this configuration, the slipping of a workpiece can be prevented and further increasing the motion speed while the arm part is traveling, by making the motion speed of the arm part constant.

7 Claims, 8 Drawing Sheets

ROBOT AND METHOD FOR CONTROLLING MOTOR SPEED OF THE ROBOT

BACKGROUND OF THE INVENTION

1. Field of the Invention

The present invention relates to a robot and a method for controlling a motor speed of the robot, and more particularly, to a robot and a method for controlling a motor speed of the robot, so as to operate a robot having an arm thereof.

2. Description of the Related Art

Generally, an industrial robot is comprised of a body for centrally supporting the robot, a manipulator including an arm moving an end effector of the robot into which a tool required for an assigned work is inserted to a specified position of a working area, a controller for controlling the manipulator, and a power supply source supplying electric power to them. A servomotor is mounted on each arm of the manipulator, and the controller controls the servomotors, thereby allowing the assigned work to be performed.

Typically, the controller is comprised of a main controller, a position controller and a servo driver for driving the servomotor.

The main controller generates a speed command profile based on a user's motion command such as a present position and a target position inputted by the user, etc. and transmits it to the position controller.

The position controller controls the servo driver based on the received speed command profile to drive the servo motor so as to move the arm from a position to a different position, and on the other hand, feedback-controls the position of the arm based on the present position inputted from an encoder, etc. mounted on the servo motor.

Figure 7:
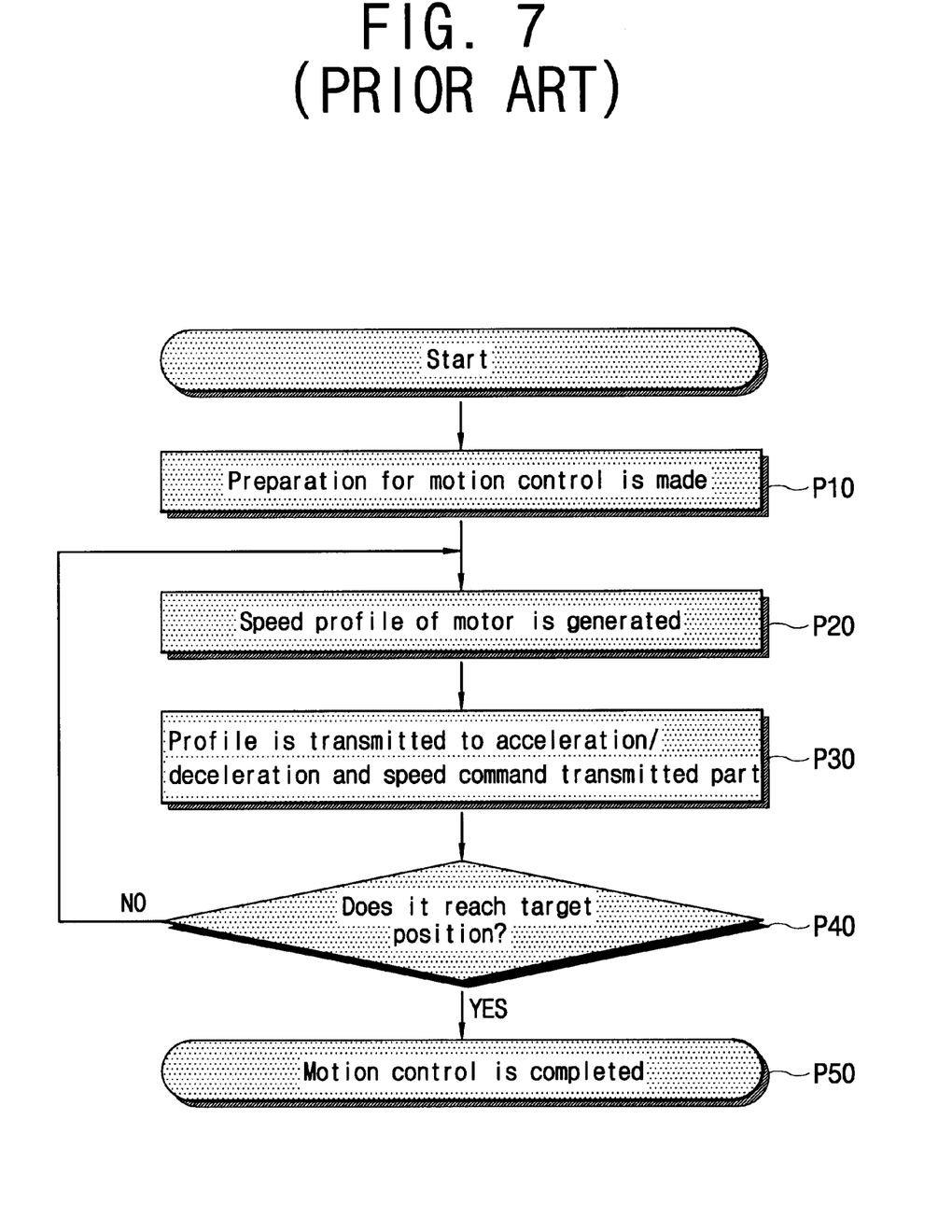
FIG. 7 is a flow chart for generating a speed command profile according to a conventional art.

Referring to FIG. 7 which is a flow chart for generating a conventional speed command profile, a conventional robot first makes preparations for controlling an operation thereof (P10). When the preparation for the operation control is completed, a speed profile of a motor is generated (P20). If the motor speed profile is generated, the speed profile is transmitted to acceleration/deceleration command transmitter part (P30). If the speed profile is transmitted to the command transmitter part, the command transmitter part determines whether the arm connected to a rotation shaft of the motor arrives at the target position (P40). If it is determined that the arm reaches the target position, the command transmitter part terminates the operation of the motor (P50).

Figure 8:
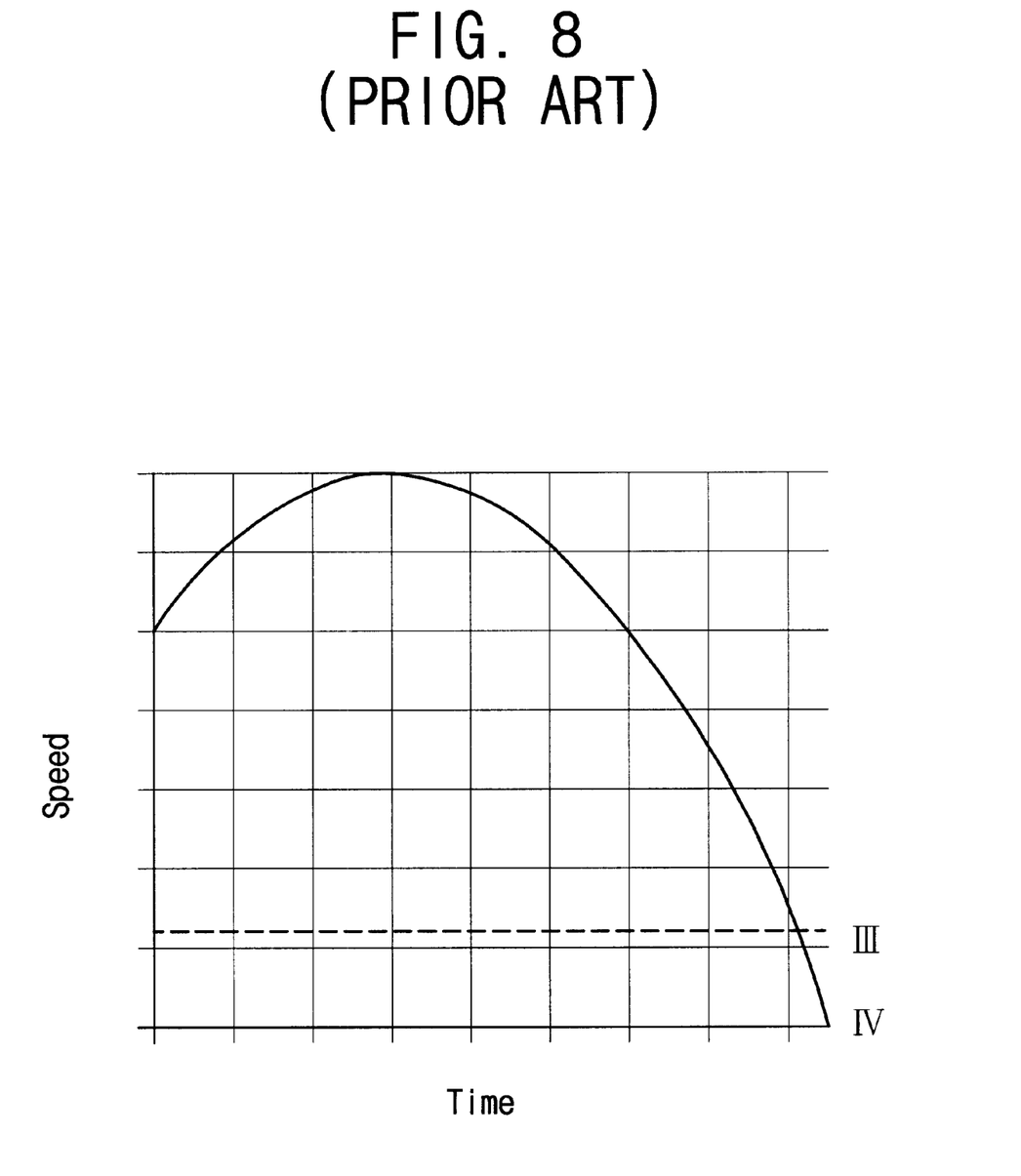
FIG. 8 is a graph of a motor speed profile and a speed profile of an arm in uniform speed range according to the conventional art.

Hereinbelow, a related art will be described with reference to FIG. 8 which is a graph of a motor speed profile and a speed profile of an arm in uniform speed range according to the conventional art.

With respect to a conventional robot having a multi-articulated arm part, a track generating method by a point-to-point operation is used to generate the track. Where the multi-articulated arm part is driven by this track generating method, the motor speed is maintained constantly, and therefore, the motion speed of the arm part is not uniform, thereby generating a graph IV in which the speed varies.

Like this, since the arm part is not constant in speed and its acceleration and deceleration are repeated, the operation of the arm part does not remain constant in speed, thereby being likely to make a workpiece seated on the arm part slipped. To prevent the workpiece from being slipped, there has been used a method of generating a track by extending the acceleration time and the deceleration time of the arm part. However, since the operation speed of the motor is conspicuously reduced, the motion time required for traveling the workpiece is prolonged.

SUMMARY OF THE INVENTION

Accordingly, the present invention has been made keeping in mind the above-described shortcoming, and an object of the present invention is to provide a robot and a method of controlling a motor speed of the robot, to prevent slipping of the workpiece during motion and improve the motion speed of the arm part.

This and other objects of the present invention may be accomplished by a provision of a method of controlling a robot including a motor having a rotation shaft, an arm part having one end connected to the rotation shaft and interlocking with a rotation of the motor, a position controller controlling the motor, and a main controller generating a speed command profile for controlling the motor, based on the inputted motion command of the arm part and transmitting the profile to the position controller, comprising a step of generating the speed command profile controlling a speed of the motor so as to allow the arm part to have an acceleration profile in uniform speed.

Preferably, the arm part is comprised of a drive arm having one end connected to the rotation shaft of the motor and the other end provided with a drive shaft thereon, and an interlock arm interlocked with a motion of the drive arm, and the step of generating the speed command profile of the motor further comprises the sub-step of preparing for the motion control which converts the change angle formed by the drive arm and the interlock arm into a value at rectangular coordinate system, using Equation (1), $$P_0 = \sqrt{2^*L^*L(1-\cos(2^*D_0))}^*\sin(D_0)$$
$$P_1 = \sqrt{2^*L^*L(1-\cos(2^*D_1))}^*\sin(D_1), \quad (1)$$

where $D_0$ is an initial angle of the arm part, $D_1$ is a target angle of the arm part, $P_0$ is a value at an initial rectangular coordinate system of the arm part according to the initial angle of the arm part, and $P_1$ is a value at rectangular coordinate system according to the target angle of the arm part.

Effectively, the motion control preparation step is further comprised of the sub-step of obtaining a traveling distance ($\Delta P$) of the arm part by a difference ($P_1-P_0$) between the value at the initial rectangular coordinate system and the value at the rectangular coordinate system according to the target angle of the arm part.

Preferably, the motion control preparation step is further comprised of the sub-steps of establishing a motion speed of the arm part by the user when the traveling distance of the arm part is obtained, and obtaining the motion time of the arm part based on the established motion speed and the traveling distance of the arm part.

Still preferably, the change angle of the arm part is again obtained according to Equation (3) where $P_0$ is less than $\sqrt{2}^*L$ if the motion time is obtained.

$$D_{out} = (2^*L^*L - P_0^*P_0)/2^*L^*L \quad (3)$$

According to another aspect of the present invention, this and other objects may also be accomplished by the provision of a robot including a motor having a rotation shaft, an arm part having one end connected to the rotation shaft and interlocking with a rotation of the motor, a position controller controlling the motor, comprising a main controller generating a speed command profile for controlling the motor, based on the inputted motion command of the arm part so as to allow the arm part to have an acceleration profile in uniform speed and transmitting the profile to the position controller.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

A preferred embodiment of the present invention will be described in more detail with reference to the accompanying drawings.

Figure 1:
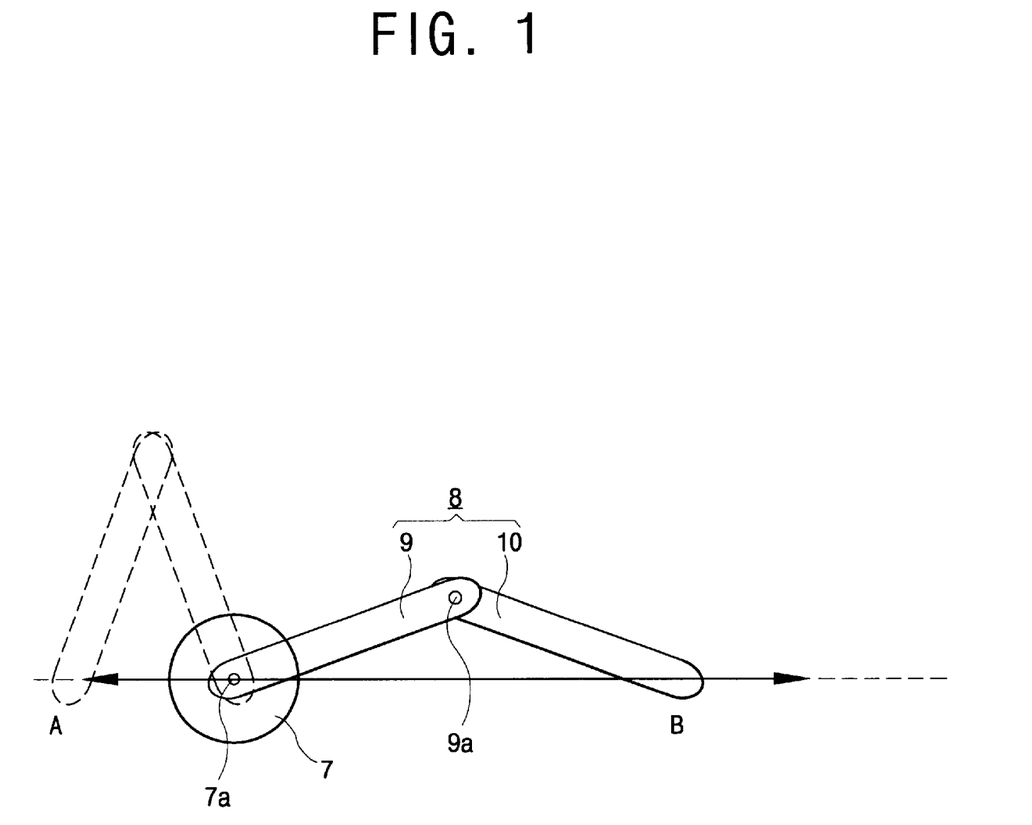
FIG. 1 is a schematic diagram of a motor and an arm of a robot according to the present invention.

Referring to FIG. 1 which is a schematic diagram of a motor and an arm of a robot according to the present invention, a robot is comprised of a motor 7 having a rotation shaft 7a, and an arm part 8 including a drive arm 9 having one end connected to the rotation shaft 7a and the other end provided with a drive shaft 9a thereon, and an interlock arm 10 connected to the drive shaft 9a so as to be interlocked with the drive arm 9. With this arrangement, a track resulting from motion of the arm part 8 connected to the rotation shaft 7a of the motor 7 during the rotation motion of the motor 7 becomes a straight line.

Figure 2:
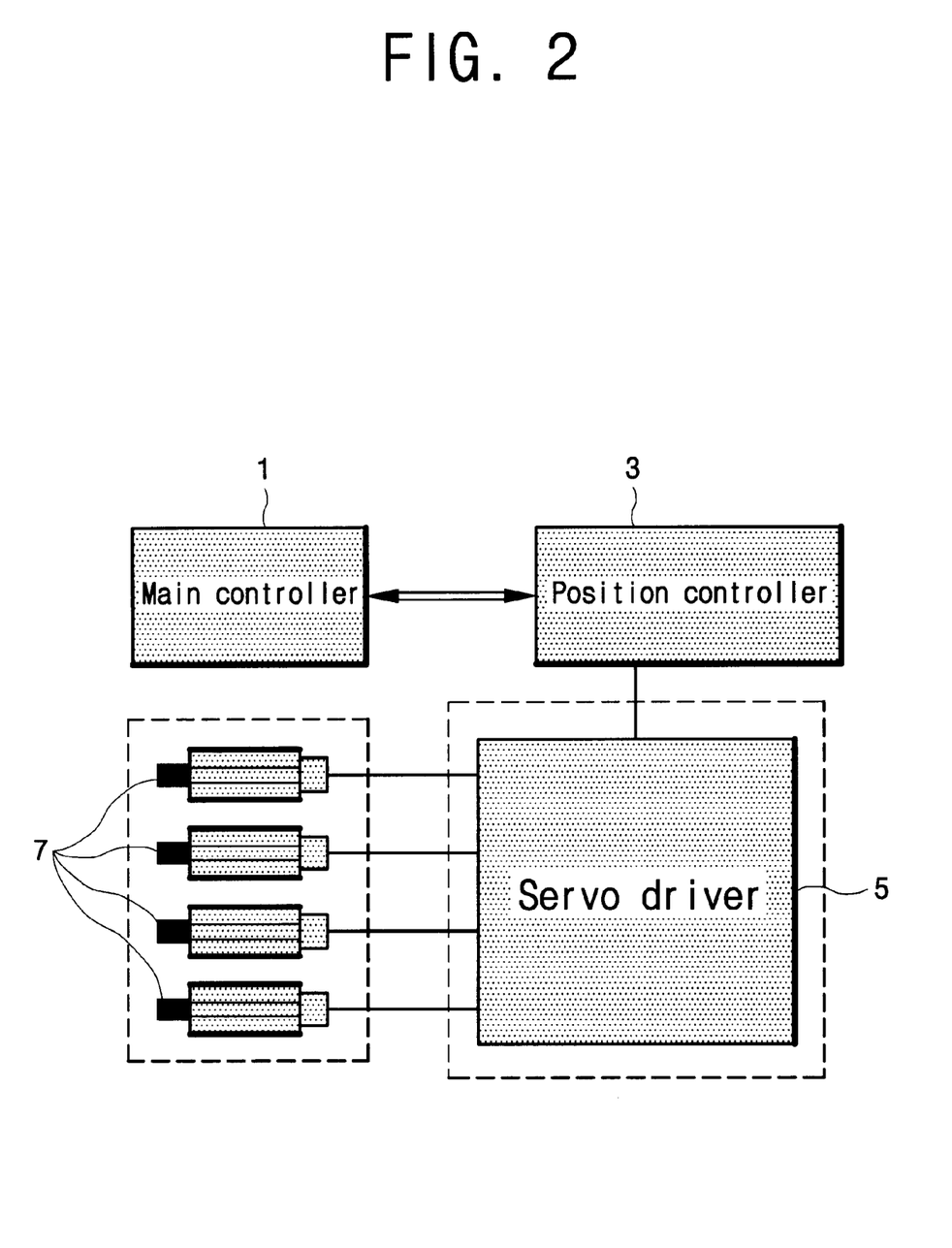
FIG. 2 is a schematic block diagram of the robot according to the present invention.
Figure 3:
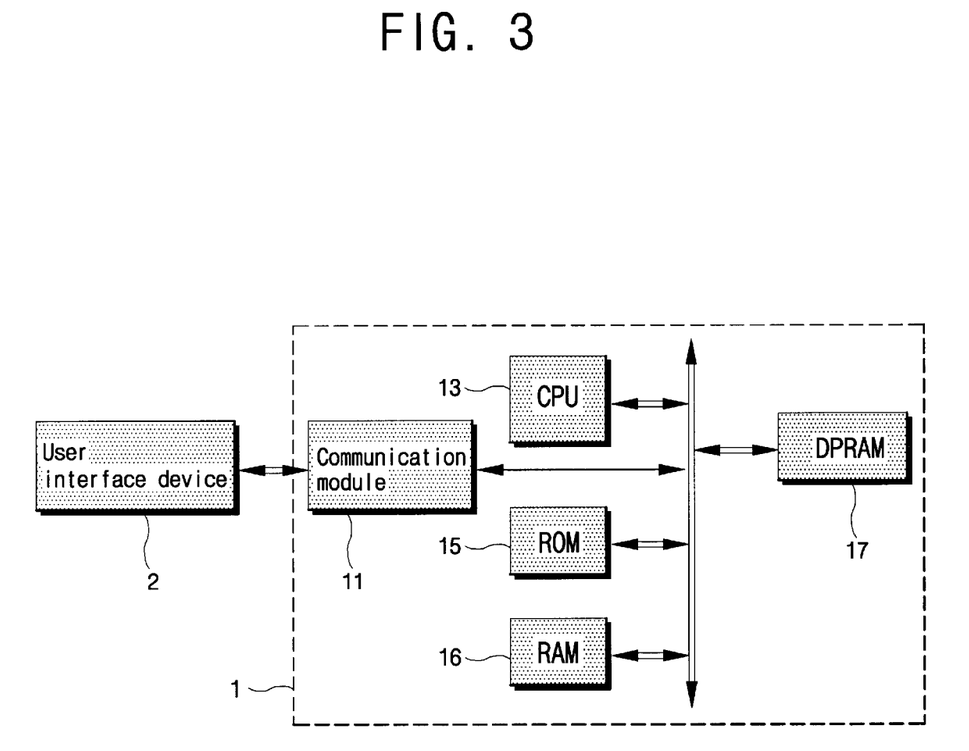
FIG. 3 is a schematic block diagram of a main controller according to the present invention.

FIG. 2 is a schematic block diagram of a robot according to the present invention, and FIG. 3 is a schematic block diagram of a main controller according to the present invention. As shown therein, the robot is comprised of the motor 7, a main controller 1 controlling the whole motion of the robot, a position controller 3 controlling a servo driver 5 to be described later, based on a speed command profile from the main controller 6 and at the same time feedback-controling a position of the robot, a servo driver 5 receiving a command from the position controller 3 to drive the motor 7. The servo driver 5 is informed a position of the robot through an encoder cable (not shown), and the position controller 3 outputs a speed command to the servo driver 5 and receives the position information through the encoder cable. The position controller 3 feedback-controls the position of the robot, using the position information to be inputted.

Referring back to FIG. 3, the main controller 1 is comprised of a communication module 11 for communicating with a user interface device 2 allowing the user to program a motion command of the robot, a central processing unit (CPU) 13 for generating a speed command profile, a read only memory (ROM) 15 for storing a program for controlling a robotic system in an execution code, a random access memory (RAM) 16 for storing a user's command program and a variable information required for operation for generating a speed profile from the CPU, and a dual port RAM (DPRAM) 17 for communicating with the position controller 3 with respect to a speed command and a position information. The DPRAM is a memory device readable and writable bi-directionally.

Figure 4:
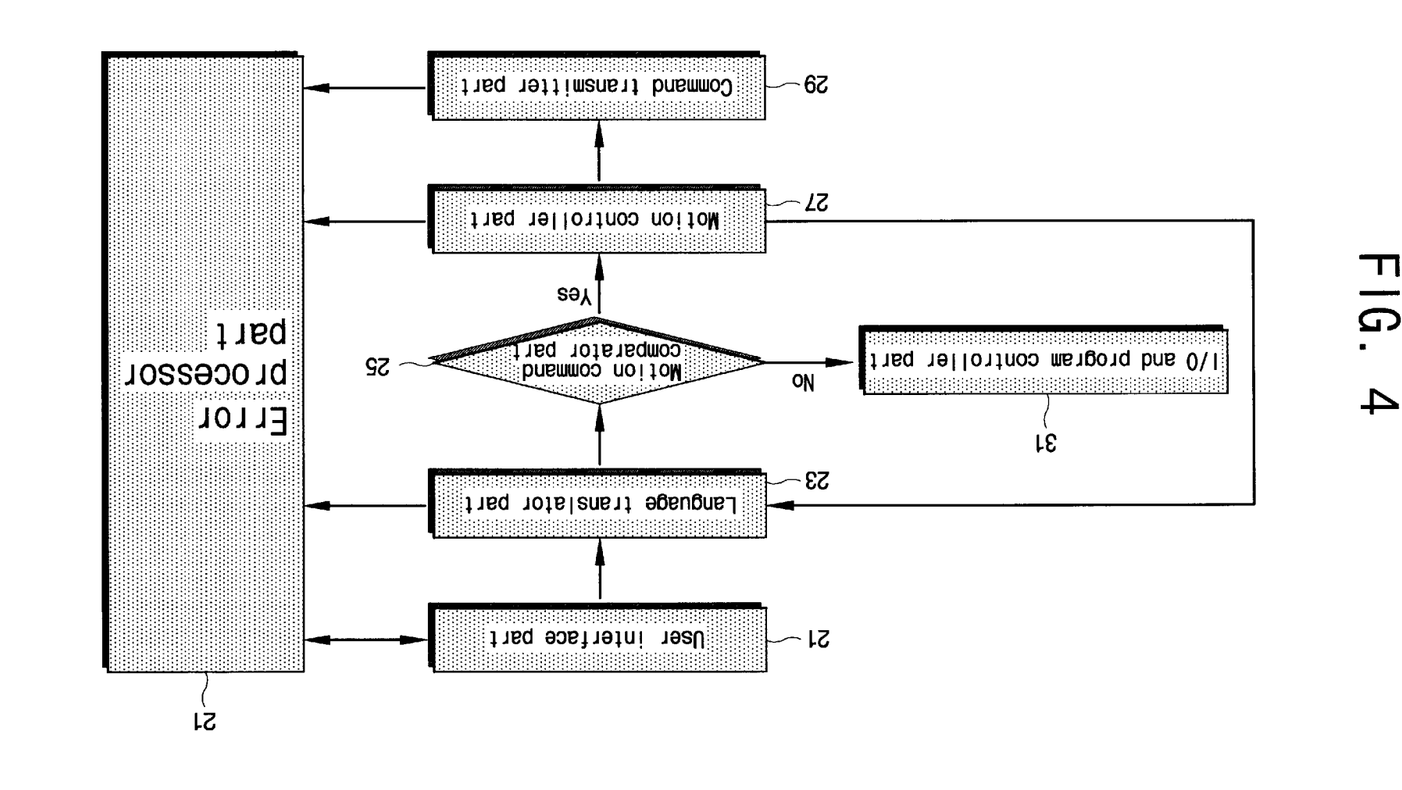
FIG. 4 is a block diagram of a program for generating a speed command profile.
Figure 5:
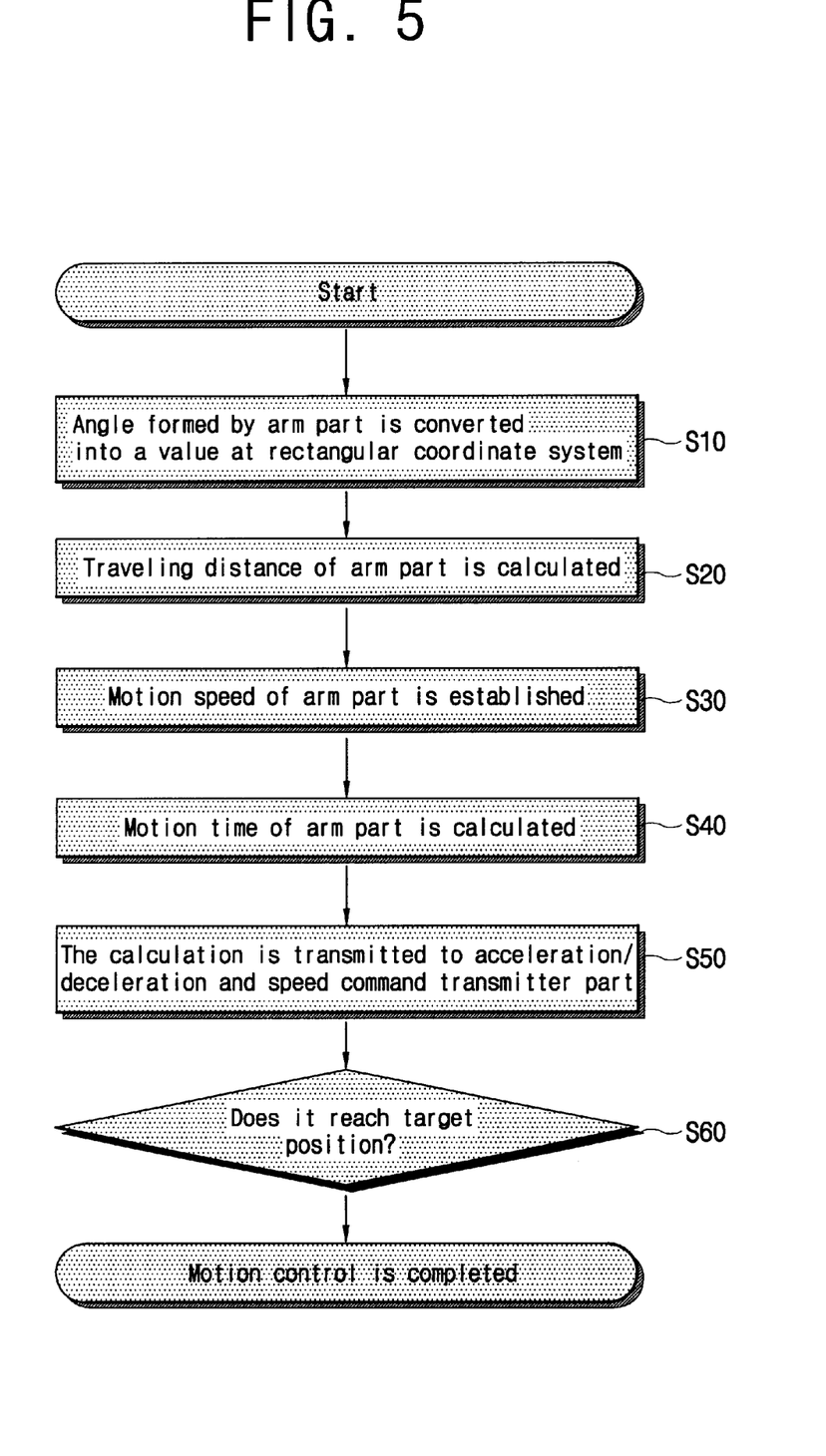
FIG. 5 is a flow chart for generating a speed command profile of a motion controller.

The present invention will be further described with reference to FIG. 4 which is a block diagram of a program for generating the speed command profile, and FIG. 5 which is a flow chart for generating the speed command profile of a motion controller.

When electric power is supplied to a control device, the execution code in the ROM 15 is enabled. While the execution code is being run, any necessary information is stored in the RAM 16. Referring to a program block diagram for generating a speed command profile made within the main controller 1, the program is comprised of a user interface part 21, a language translator part 23, a motion command comparator part 25, an input/out (I/O) and program controller part 31, a motion controller 27, a command transmitter part 29 and an error processor part 33. The user interface part 21 receives and translates a drive command for driving the robot and transmits the result, to the user interface device 2, the language translator part 23 translates the robotic language, the motion command comparator part 25 compares drive commands of the robot, the I/O and program controller part 31 processes control of the input/output and program based on the value result from the comparison by the motion command comparator part 25, the motion controller part 27 generating a traveling track of the motor in position, a command transmitter part 29 transmits the speed command to the position controller 3 through the DPRAM, and the error processor part 33 analyzes and processes abnormalities generated in each part.

If a user command program written in a predetermined robotic language is inputted into the main controller 1 through the user interface device 2, the language translator part 21 translates the command program. The language translator part 21 sends the motion command to the motion controller part 27 where the command is translated to command a motion of the robot. The motion controller part 27 informed of the motion command and a target position operates an equation to be expressed later, in order to prepare for the motion control, according to the target position and a speed of the arm part 8 established by the user. In the step of preparing for motion control, the uniform speed range is obtained according to a difference between the present position and the target position, which is an amount of position change.

First, an angle of the change formed by the drive arm 9 and the interlock arm 10 is converted into a value at rectangular coordinate system, using Equation (1), according to an initial angle and a target angle (S10).

$$P_0 = \sqrt{2*L*L(1-\text{Cos}(2*D_0))}*\text{Sin}(D_0)$$
$$P_1 = \sqrt{2*L*L(1-\text{Cos}(2*D_1))}*\text{Sin}(D_1), \quad (1)$$

(where Sin(X)=1 when X equals 0, and Sin(X)=−1, when X is less than 0. $D_0$ is an initial angle of the arm part 8, $D_1$ is a target angle of the arm part 8, $P_0$ is a value at an initial rectangular coordinate system of the arm part 8 according to the initial angle of the arm part 8, and $P_1$ is a value at rectangular coordinate system according to the target angle of the arm part 8.)

Next, a traveling distance of the arm part 8 is obtained by a difference between the value at the initial rectangular coordinate system and the value at the target rectangular coordinate system according to the target angle of the arm part (S20).

$$\Delta P = P_1 - P_0 \qquad (2)$$

When the traveling path of the arm part 8 is obtained, a motion speed of the arm part 8 is established (S30), and then a motion time of the arm part 8 is obtained based on the established motion speed and the traveling path of the arm part 8 (S40). The motion time of the arm part 8 is obtained by dividing $\Delta P$ by a maximum motion speed of a sampling time of the arm part 8 (that is, motion time=traveling path of arm part/established motion speed).

When the motion time of the arm part 8 is obtained, a position value to be traveled within the sampling time during the motion time is obtained. If the motion time is obtained, a change angle of the arm part 8 is again obtained according to Equation (2) where $P_0$ is less than $\sqrt{2}*L$.

$$D_{out} = (2*L*L - P_0*P_0)/2*L*L \qquad (3)$$

A speed profile of the motor 7 is generated according to the above expressed equations, and the speed profile is transmitted to the command transmitter part 29 (S50). If the speed profile is transmitted to the command transmitter part 29, it is determined whether the arm part 8 connected to the rotation shaft 7a of the motor 7 reaches the target position (S60). If it is determined that the arm part 8 arrives at the target position, a motion of the motor 7 is completed (S70).

Figure 6:
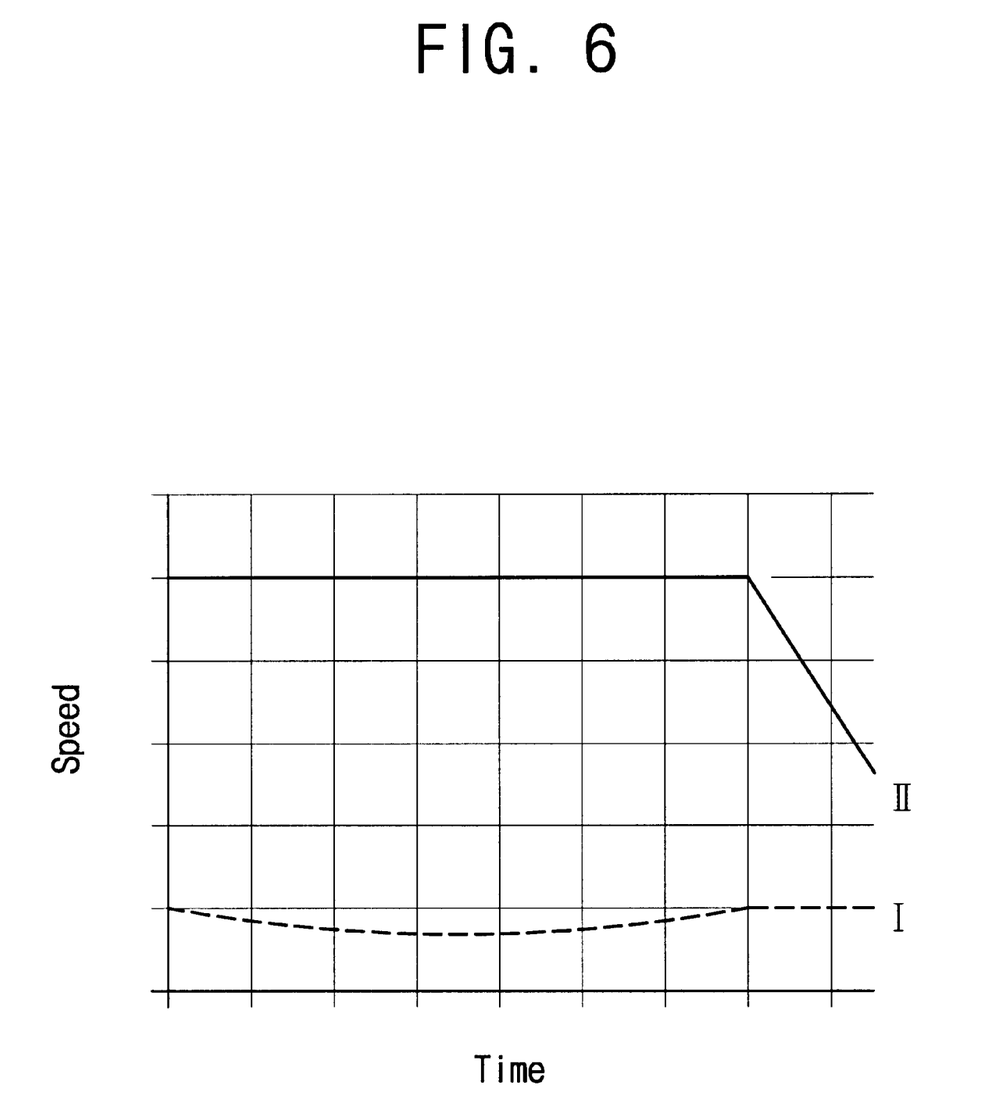
FIG. 6 is a graph of a motor speed profile and a speed profile of an arm according to the present invention.

By further including a step of generating the speed command profile controlling a speed of the motor so as to allow the arm part 8 to have an acceleration profile in uniform speed, the motion speed of the arm part 8 can be maintained at a constant speed.

As described above, the present invention provides a robot and a method of controlling a motor speed of the robot wherein the slipping of a workpiece can be prevented and further increasing the motion speed while the arm part is traveling, by making the motion speed of the arm part constant.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A method of controlling a robot including a motor having a rotation shaft, an arm part having one end connected to the rotation shaft and interlocking with a rotation of the motor, a position controller controlling the motor, and a main controller, comprising:

generating a speed command profile to control a speed of the motor based on a motion command of the arm part inputted by a user, and transmitting the profile to the position controller, so as to allow the arm part to have an acceleration profile in uniform speed.

2. The method according to claim 1, wherein the arm part comprises a drive arm having one end connected to the rotation shaft of the motor and the other end provided with a drive shaft thereon, and an interlock arm interlocked with a motion of the drive arm, and the generating the speed command profile further comprises preparing for a motion control which converts a change angle formed by the drive arm and the interlock arm into a value at rectangular coordinate system, using Equation (1), $$P_0 = \sqrt{2*L*L(1-\cos(2*D_0))} * \sin(D_0)$$
$$P_1 = \sqrt{2*L*L(1-\cos(2*D_1))} * \sin(D_1), \qquad (1)$$

where $D_0$ is an initial angle of the arm part, $D_1$ is a target angle of the arm part, $P_0$ is a value at an initial rectangular coordinate system of the arm part according to the initial angle of the arm part, and $P_1$ is a value at rectangular coordinate system according to the target angle of the arm part.

3. The method according to claim 2, wherein the motion control preparation further comprises obtaining a traveling distance ($\Delta P$) of the arm part by a difference ($P_1 - P_0$) between the value at the initial rectangular coordinate system and the value at the rectangular coordinate system according to the target angle of the arm part.

4. The method according to claim 3, wherein the motion control preparation further comprises establishing a motion speed of the arm part by the user when the traveling distance of the arm part is obtained, and obtaining a motion time of the arm part based on the established motion speed and the traveling distance of the arm part.

5. The method according to claim 4, wherein the change angle of the arm part is obtained according to Equation (3), where $P_0$ is less than $\sqrt{2}*L$ if the motion time is obtained, $$D_{out} = (2*L*L - P_0*P_0)/2*L*L \qquad (3).$$

6. A robot including a motor having a rotation shaft, an arm part having one end connected to the rotation shaft and interlocking with a rotation of the motor, and a position controller controlling the motor, comprising:

a main controller to generate a speed command profile to control a speed of the motor based on a motion command of the arm part inputted by a user, and transmitting the profile to the position controller, so as to allow the arm part to have an acceleration profile in uniform speed.

7. A robot comprising:

a motor having a rotation shaft;

an arm part having one end connected to the rotation shaft and interlocking with a rotation of the motor;

a position controller to control the motor; and a main controller to generate a speed command profile to control a speed of the motor based on a motion command of the arm part inputted by a user, and transmitting the profile to the position controller, thereby allowing the arm part to have an acceleration profile in uniform speed.

* * * * *

UNITED STATES PATENT AND TRADEMARK OFFICE
CERTIFICATE OF CORRECTION

PATENT NO. : 6,528,963 B1 Page 1 of 1
DATED : March 4, 2003
INVENTOR(S) : Yong Joon Hong It is certified that error appears in the above-identified patent and that said Letters Patent is hereby corrected as shown below:

<u>Title page,</u>
Item [56], References Cited, insert:

-- FOREIGN PATENT DOCUMENTS

| | | |
|---|---|---|
| KR | 95-668 | 01/1995 |
| KR | 1999-32438 | 07/1999 |
| KR | 1999-70427 | 09/1999 |
| KR | 2000-11887 | 02/2000 -- |

Signed and Sealed this

Twenty-second Day of July, 2003

JAMES E. ROGAN
*Director of the United States Patent and Trademark Office*